(12) United States Patent
Torgersen

(10) Patent No.: US 9,882,367 B2
(45) Date of Patent: Jan. 30, 2018

(54) DEVICE FOR CONDUCTING ELECTRICAL DIRECT CURRENT

(71) Applicant: Siemens Aktiengesellschaft, Munich (DE)

(72) Inventor: Haakon Torgersen, Heimdal (NO)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/314,403

(22) PCT Filed: Apr. 27, 2015

(86) PCT No.: PCT/EP2015/059040
§ 371 (c)(1),
(2) Date: Nov. 28, 2016

(87) PCT Pub. No.: WO2015/180906
PCT Pub. Date: Dec. 3, 2015

(65) Prior Publication Data
US 2017/0229854 A1     Aug. 10, 2017

(30) Foreign Application Priority Data

May 28, 2014  (EP) ..................................... 14170388

(51) Int. Cl.
*H02G 5/02* (2006.01)
*H01B 1/02* (2006.01)

(52) U.S. Cl.
CPC ................. *H02G 5/02* (2013.01); *H01B 1/02* (2013.01)

(58) Field of Classification Search
CPC ........ H02B 13/025; H02G 5/00; H02G 5/005; H02G 5/02; H01B 1/02

USPC ..... 174/84 R, 129 B, 36; 428/587, 595, 676, 428/677, 928, 933
See application file for complete search history.

(56) References Cited

U.S. PATENT DOCUMENTS

| | | | | | |
|---|---|---|---|---|---|
| 1,513,340 | A | * | 10/1924 | Miner ...................... | H02G 5/02 174/129 B |
| 1,561,270 | A | * | 11/1925 | Miner ...................... | H02G 5/00 174/129 B |
| 1,574,993 | A | * | 3/1926 | Miner ...................... | H02G 5/00 174/129 B |

(Continued)

FOREIGN PATENT DOCUMENTS

| | | |
|---|---|---|
| CN | 201297847 | 8/2009 |
| CN | 201466976 | 5/2010 |

(Continued)

OTHER PUBLICATIONS

Abott, J.: "High Frequency AC Harmonics on a HVDC Transmission Line might be attenuated by conductor design"; pp. 58-60.

(Continued)

*Primary Examiner* — Timothy Thompson
*Assistant Examiner* — Michael F McAllister
(74) *Attorney, Agent, or Firm* — Cozen O'Connor

(57) ABSTRACT

A device for conducting electrical direct current, wherein the device includes at least one bus bar and at least one electrically conducting edge element that is connected to the bus bar in an electrically conducting manner and has a lower electrical conductivity than the bus bar, where the edge element is arranged on a lateral outer face of the bus bar and extends along the bus bar.

9 Claims, 2 Drawing Sheets

(56) References Cited

U.S. PATENT DOCUMENTS

| | | | | |
|---|---|---|---|---|
| 1,582,850 | A | * | 4/1926 | Miner ..................... H02G 5/02 |
| | | | | 174/129 B |
| 3,829,707 | A | | 8/1974 | Pflanz |
| 4,079,192 | A | * | 3/1978 | Josse ....................... H01B 7/30 |
| | | | | 174/113 R |
| 4,678,253 | A | | 7/1987 | Hicks, Jr. et al. |
| 5,854,445 | A | | 12/1998 | Graham et al. |
| 6,265,666 | B1 | * | 7/2001 | Faulkner ................. H02G 5/06 |
| | | | | 174/70 B |
| 9,006,571 | B2 | * | 4/2015 | Manhart .................. H02B 1/21 |
| | | | | 174/129 B |

FOREIGN PATENT DOCUMENTS

| | | |
|---|---|---|
| DE | 32 16 275 A1 | 9/1983 |
| FR | 1 543 660 A | 10/1968 |
| GB | 21 60 011 A | 12/1985 |
| JP | 2008-172976 | 7/2008 |

OTHER PUBLICATIONS

Ducluzaux A; "Extra losses caused in high current conductors by skin and proximity effects"; Cahier Technique—Schneider Electric; Nr. 83; pp. 1-19; XP002585431; 1983.

Written Opinion and Search Report dated Aug. 25, 2017 which issued in the corresponding Singapore Patent Application No. 11201609198U.

Office Action dated Oct. 23, 2017 which issued in the corresponding Chinese Patent Application No. 201580027746.4.

* cited by examiner

DEVICE FOR CONDUCTING ELECTRICAL DIRECT CURRENT

CROSS-REFERENCE TO RELATED APPLICATIONS

This is a U.S. national stage of application No. PCT/EP2015/059040 filed 27 Apr. 2015. Priority is claimed on European Application No. 14170388 filed 28 May 2014, the content of which is incorporated herein by reference in its entirety.

BACKGROUND OF THE INVENTION

1. Field of the Invention

The invention relates to a device for conducting electrical direct current, having at least one bus bar. Here, term bus bar is to be understood as an electrical conductor for the distribution of electrical energy.

2. Description of the Related Art

Usually, bus bars are usually made of copper or aluminum, and are in an electrically uninsulated form.

SUMMARY OF THE INVENTION

It is an object of the invention to provide an improved device for conducting electrical direct current, having at least one bus bar, and which is particularly suitable for limiting electrical short-circuit currents.

This and other objects and advantages are achieved in accordance with the invention by a device for conducting electrical direct current that incorporates at least one bus bar and at least one electrically conducting edge element, arranged on a lateral external surface of the bus bar and extending along the bus bar, which is bonded to the bus bar in an electrically conducting manner and which has a lower electrical conductivity than the bus bar.

Here, the edge elements serve to suppress current components that change at a high frequency. For this purpose, the invention makes use of the skin effect in electrical conductors, by which electrical currents within a conductor that change at a high frequency are carried mainly close to the external surfaces of the conductor. By the inventive arrangement of edge elements on external surfaces of bus bars, electrical currents that change at a high frequency are thus fed to the edge elements, where they are suppressed at this location due to the lower electrical conductivity of the edge elements in comparison to the bus bar. This effect advantageously permits, in particular, the suppression of components of electrical short-circuit currents with current strengths that change at a high frequency, which typically arise in direct current circuit arrangements. The invention thereby permits a simple and cost-effective reduction in electrical short-circuit currents in direct current bus bars.

In an embodiment of the invention, at least two edge elements are arranged on lateral external surfaces on opposite sides of a bus bar. In this way, the skin effect is even better used and electrical short-circuit currents can advantageously be yet further reduced.

In another embodiment of the invention, several bus bars are arranged alongside each other in a stack-like manner. This embodiment makes it possible to utilize not only the skin effect but also the proximity effect, in order to force out electrical currents that change at a high frequency into edge elements. Here, the term proximity effect is to be understood as a current displacement between two neighboring electrical conductors under the influence of alternating currents.

In the case of the embodiment of the invention cited above, it is preferable if at least one edge element extents over several bus bars arranged alongside each other in a stack-like manner, wherein the at least one edge element is arranged on lateral external surfaces of these bus bars and is bonded to each of these bus bars in an electrically conducting manner. This simplifies the construction of the inventive device, because one edge element can be used for several bus bars, and thus the individual bus bars do not need to be provided separately with edge elements.

In a further embodiment of the invention, at least one bus bar is made of copper or aluminum. Due to their high electrical conductivity, copper and aluminum are particularly suitable as materials for bus bars.

In yet a further embodiment of the invention, at least one edge element is made of iron or a steel, in particular stainless steel. Due to their low electrical conductivity, iron and steel, particularly stainless steel, are particularly suitable as materials for edge elements.

In a further embodiment of the invention, at least one bus bar is constructed in strip or plate-shaped form. Advantageously, bus bars constructed in strip or plate-shaped form permit good heat dissipation from the bus bars.

The disclosed embodiments of the invention particularly provide the use of an inventive device for limiting electrical short-circuit currents in an electrical circuit arrangement, where at least one bus bar of the device is electrically bonded to one pole of an electrical direct current source. The foregoing use advantageously exploits the above-cited reduction in electrical short-circuit currents in a device in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, characteristics and advantages of this invention described above, together with the way and manner in which these are achieved, will become more clearly and plainly comprehensible in conjunction with the following description of exemplary embodiments, which are explained in more detail in conjunction with the drawings, in which.

DETAILED DESCRIPTION OF THE EXEMPLARY EMBODIMENTS

Figure 1:
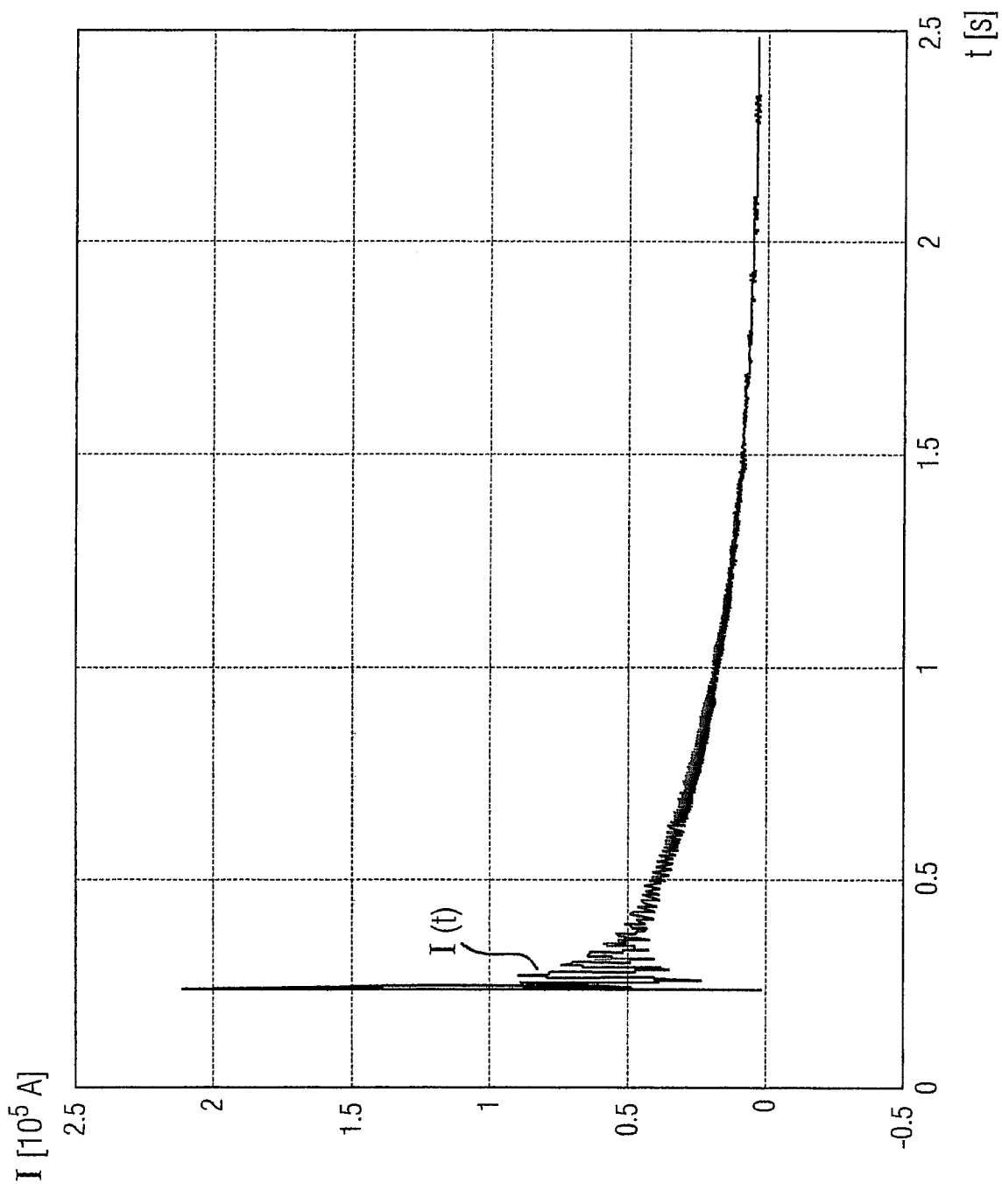
FIG. 1 is an exemplary graphical plot of a short circuit current in a direct current circuit arrangement.

FIG. 1 shows an exemplary graphical plot I(t) of a short-circuit current I in a direct current circuit arrangement, as a function of time t. The current strength of the short-circuit current I changes with a high frequency about a mean value that decreases over time. Here, the high-frequency changes in the short-circuit current I can be caused and influenced by various electrical components in a direct current circuit arrangement, such as by rectifiers or capacitors.

Figure 2:
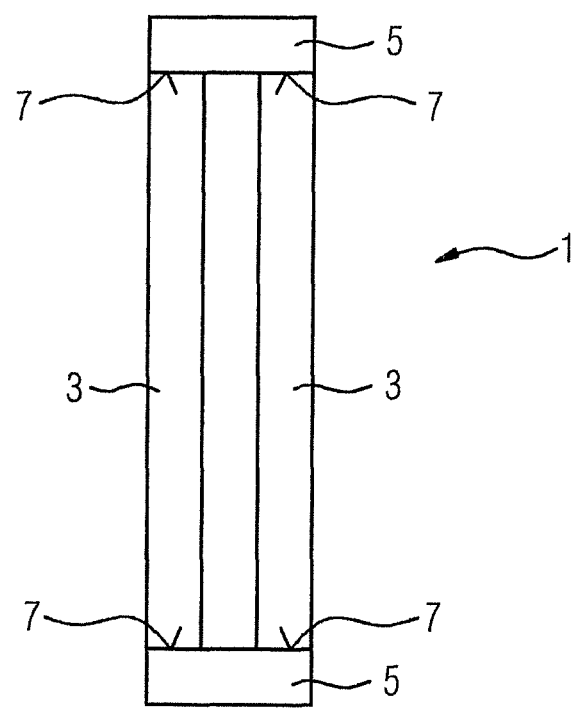
FIG. 2 is a cross-sectional view of a device in accordance with the invention for conducting electrical direct current.

FIG. 2 shows a cross-sectional view of a device 1 in accordance with the invention for conducting an electrical direct current. The device 1 incorporates two bus bars 3 and two edge elements 5.

The two bus bars 3 are of the same type, and are each made in a strip-shaped form with a rectangular cross-sectional area, and is made, for example, out of copper or aluminum. The two bus bars 3 are arranged alongside and parallel to each other in a stacked manner, with a space between them.

The two edge elements 5 are of the same type and are each made in a plate-like form with a rectangular cross-sectional area and are made, for example, of iron or steel, particularly stainless steel.

Each edge element 5 lies against both bus bars 3, with the edge elements being arranged against opposite sides of the bus bars 3. In this way, a surface of each edge element 5 lies against a lateral external surface 7 of each bus bar 3, and has an electrically conducting bond to both bus bars 3 via these lateral external surfaces 7. Each of the two edge elements 5 extends, orthogonally to the plane of the drawing in FIG. 2, over the entire length of the bus bars 3.

The edge elements 5 are, for example, spaced apart by the bus bars 3 by about ten times the spacing between the bus bars 3. The thicknesses of the bus bars 3 and the edge elements 5 each correspond, for example, to about the spacing of the bus bars 3 from each other. For example, the thicknesses of the bus bars 3 and the edge elements 5, and the spacing of two bus bars 3 from each other, is in each case about 10 mm, and the spacing of the edge elements 5 from each other amounts to about 100 mm. Here, the thickness of a bus bar 3 or of an edge element 5, as applicable, is in each case to be understood as the length of one of the shorter sides of the rectangular contour of the cross-sectional area respectively of the bus bar 3 or the edge element 5.

In direct current circuit arrangements use is made, for example, of two of the devices 1 shown in FIG. 2, where the bus bars 3 of one of these devices 1 are electrically connected to one pole of an electrical direct current source and the bus bars 3 of the other device 1 are electrically connected to the other pole of the electrical direct current source.

Electrical currents that are changing at a high frequency are diverted by the skin effect and the proximity effect out of the bus bars 3 and into the edge elements 5, and are suppressed by the high electrical resistance of the edge elements 5. Simulations have shown that with this advantageous arrangement the electrical resistance of a device 1 as shown in FIG. 2 is increased, for electrical currents which are changing at a high frequency, several times over as compared to the electrical resistance of the bus bars 3, for example, by a factor of 39 for current change frequencies of 1000 Hz, when use is made of copper bus bars 3 with a cross-sectional area of 2000 mm$^2$ and edge elements 5 made of iron. In the case of a short-circuit current I with a pulse height of 220 kA, this leads to a voltage drop of some 75 V/m across a device 1. If stainless steel is used instead of iron for the material of the edge elements 5, the electrical resistance of a device 1 for currents changing with a high frequency, and the voltage drop across the device 1, can be further increased.

Although the invention has been illustrated and described in more detail by preferred exemplary embodiments, the invention is not restricted by the examples disclosed, and the person skilled in the art can deduce other variations from it without going outside the scope of the protection for the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those element which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for conducting electrical direct current, comprising:
   at least one bus bar; and
   at least one electrically conducting edge element having an electrically conducting bond to the bus bar and having a lower electrical conductivity than the bus bar, said at least one electrically conducting edge element being arranged on a lateral external surface of the bus bar and extending along the at least one bus bar such that an outer edge of the at least one electrically conducting edge element aligns with an outer edge of the at least one bus bar;
   wherein at least two edge elements are arranged on the at least one bus bar on lateral external surfaces of said at least one bus bar which lie opposite each other.

2. The device as claimed in claim 1, wherein a plurality of bus bars are arranged alongside each other in a stack-like manner.

3. The device as claimed in claim 2, wherein at least one edge element which extends across the plurality of bus bars arranged alongside each other in the stack-like manner; wherein said least one edge element is arranged on lateral external surfaces of the plurality of bus bars and is bonded to each of the plurality of bus bars in an electrically conducting manner.

4. The device as claimed in claim 1, wherein the at least one bus bar is made of one of copper and aluminum.

5. The device as claimed in claim 1, wherein the at least one edge element is made of one of iron or a steel.

6. The device as claimed in claim 5, wherein the at least one edge element is made of stainless steel.

7. The device as claimed in claim 1, wherein the at least one bus bar has one of a strip and plate-shaped construction.

8. The device of claim 1, wherein the device limits electrical short-circuit currents in an electrical circuit arrangement; and wherein the at least one bus bar of the device is electrically bonded to one pole of an electrical direct current source.

9. A device for conducting electrical direct current, comprising:
   at least one bus bar; and
   at least one electrically conducting edge element having an electrically conducting bond to the bus bar and having a lower electrical conductivity than the bus bar, said at least one electrically conducting edge element being arranged on a lateral external surface of the bus bar and extending along the at least one bus bar;

wherein at least two edge elements are arranged on the at least one bus bar on lateral external surfaces of said at least one bus bar which lie opposite each other;

wherein at least one edge element which extends across the plurality of bus bars arranged alongside each other in the stack-like manner, said at least one edge element being arranged on lateral external surfaces of the plurality of bus bars and being bonded to each of the plurality of bus bars in an electrically conducting manner.

* * * * *